United States Patent
Park et al.

(10) Patent No.: US 12,154,565 B2
(45) Date of Patent: Nov. 26, 2024

(54) AI BASED VOICE ORDERING SYSTEM AND METHOD THEREFOR

(71) Applicants: Sung Jin Park, Hwaseong-si (KR); Eun Jin Park, Seoul (KR)

(72) Inventors: Sung Jin Park, Hwaseong-si (KR); Eun Jin Park, Seoul (KR)

( * ) Notice: Subject to any disclaimer, the term of this patent is extended or adjusted under 35 U.S.C. 154(b) by 245 days.

(21) Appl. No.: 17/790,957

(22) PCT Filed: Nov. 19, 2020

(86) PCT No.: PCT/KR2020/016351
§ 371 (c)(1),
(2) Date: Jul. 5, 2022

(87) PCT Pub. No.: WO2021/137431
PCT Pub. Date: Jul. 8, 2021

(65) Prior Publication Data
US 2023/0021774 A1  Jan. 26, 2023

(30) Foreign Application Priority Data
Jan. 2, 2020  (KR) .................. 10-2020-0000381

(51) Int. Cl.
*G10L 15/22*  (2006.01)
*G06F 40/20*  (2020.01)
(Continued)

(52) U.S. Cl.
CPC .............. *G10L 15/22* (2013.01); *G06F 40/20* (2020.01); *G10L 15/26* (2013.01); *G10L 15/30* (2013.01)

(58) Field of Classification Search
USPC ........ 704/231, 232, 246, 247, 251, 252, 275
See application file for complete search history.

(56) References Cited

U.S. PATENT DOCUMENTS

| | | | |
|---|---|---|---|
| 11,694,682 B1 * | 7/2023 | Reinspach | G10L 13/027 704/251 |
| 2020/0296498 A1 * | 9/2020 | Park | H04W 4/80 |

(Continued)

FOREIGN PATENT DOCUMENTS

| | | |
|---|---|---|
| JP | 2005-182140 A | 7/2005 |
| KR | 10-2001-0016997 | 3/2001 |

(Continued)

*Primary Examiner* — Leonard Saint-Cyr
(74) *Attorney, Agent, or Firm* — Maschoff Brennan

(57) ABSTRACT

The present invention relates to an AI-based voice ordering system and a method therefor and provides a voice ordering method and system, the voice ordering method comprising: a first step of an ordering smart terminal standing by for voice data reception; a second step of the ordering smart terminal analyzing whether an input signal has been received by an input unit corresponding to a microphone activation button; and a third step of, if the analysis result indicates that an input signal has not been received, returning to the first step and, conversely, if an input signal has been received, the ordering smart terminal receiving a voice signal from a microphone, converting the voice signal into voice data of a preset format, and then transmitting the converted voice data to a voice ordering server via a host terminal connected to a network, so that analysis of text data is performed.

1 Claim, 3 Drawing Sheets

(51) Int. Cl.
*G10L 15/26* (2006.01)
*G10L 15/30* (2013.01)

(56) References Cited

U.S. PATENT DOCUMENTS

2021/0064335 A1* 3/2021 Kim .................. H04N 21/42203
2021/0183366 A1* 6/2021 Reinspach .............. G10L 15/02

FOREIGN PATENT DOCUMENTS

| KR | 10-2004-0025589 | | 3/2004 |
| KR | 10-2014-0018060 | A | 2/2014 |
| KR | 10-2014-0112893 | | 9/2014 |
| KR | 10-2016-0087895 | | 7/2016 |
| KR | 10-2017-0121958 | A | 11/2017 |
| KR | 10-2017-0133031 | A | 12/2017 |
| KR | 10-2019-0035352 | A | 4/2019 |

* cited by examiner

[FIG.1]
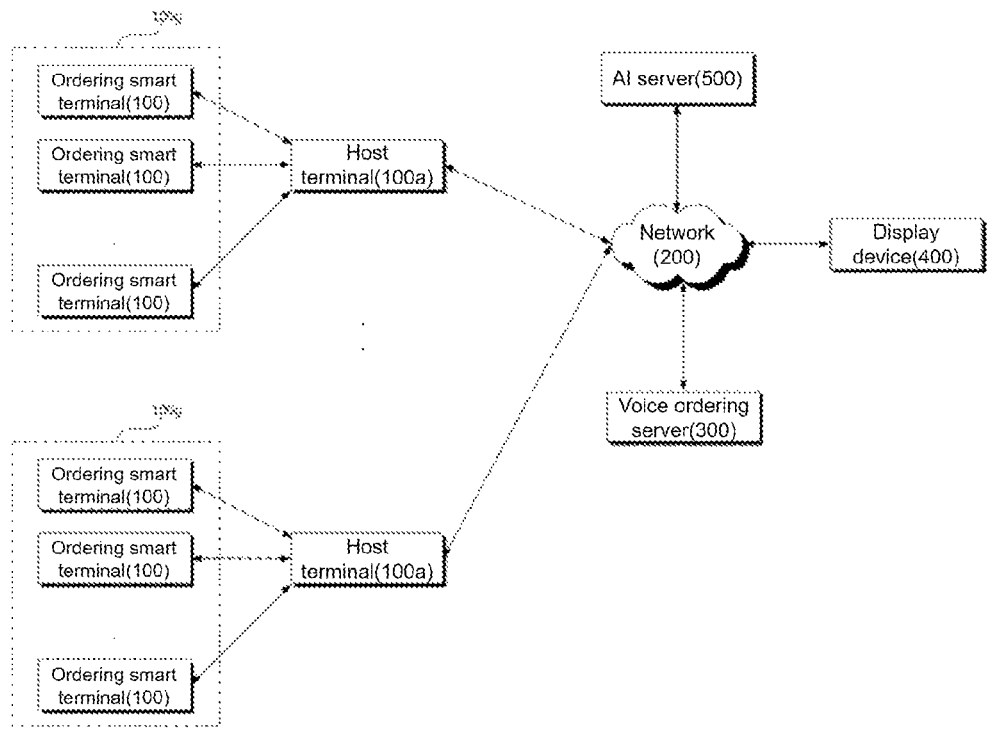
[FIG.2]
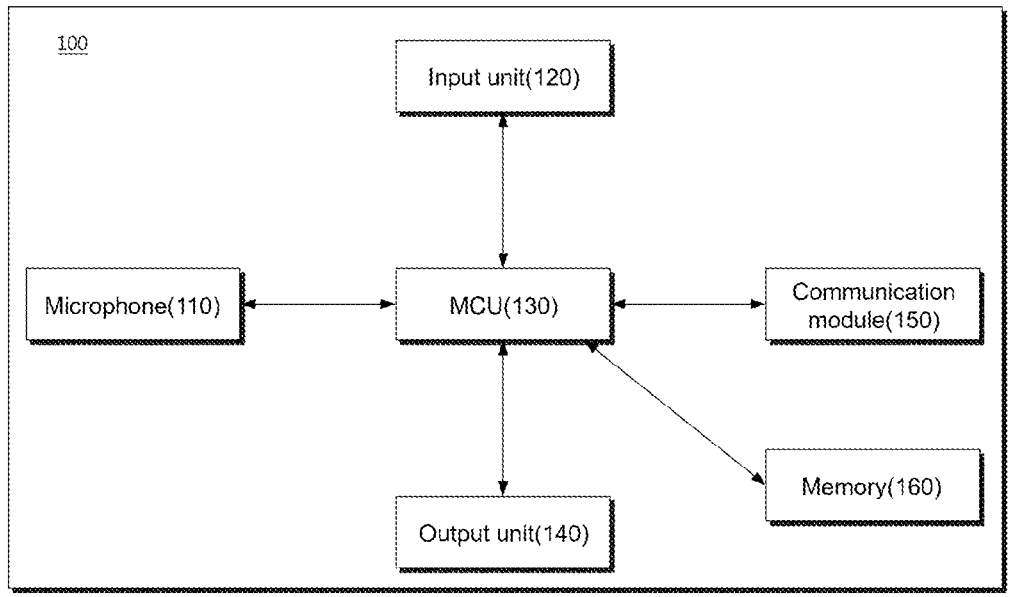

[FIG.3]
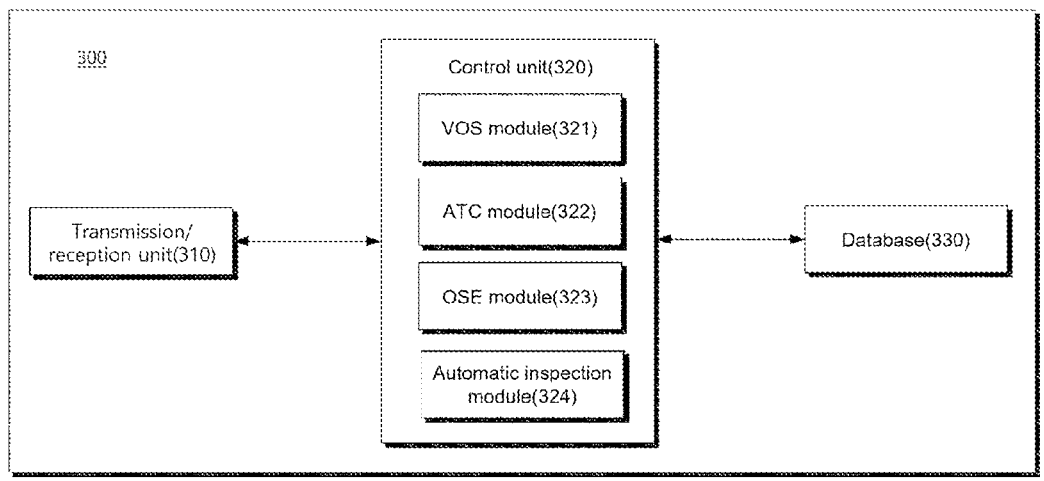

[FIG.4]
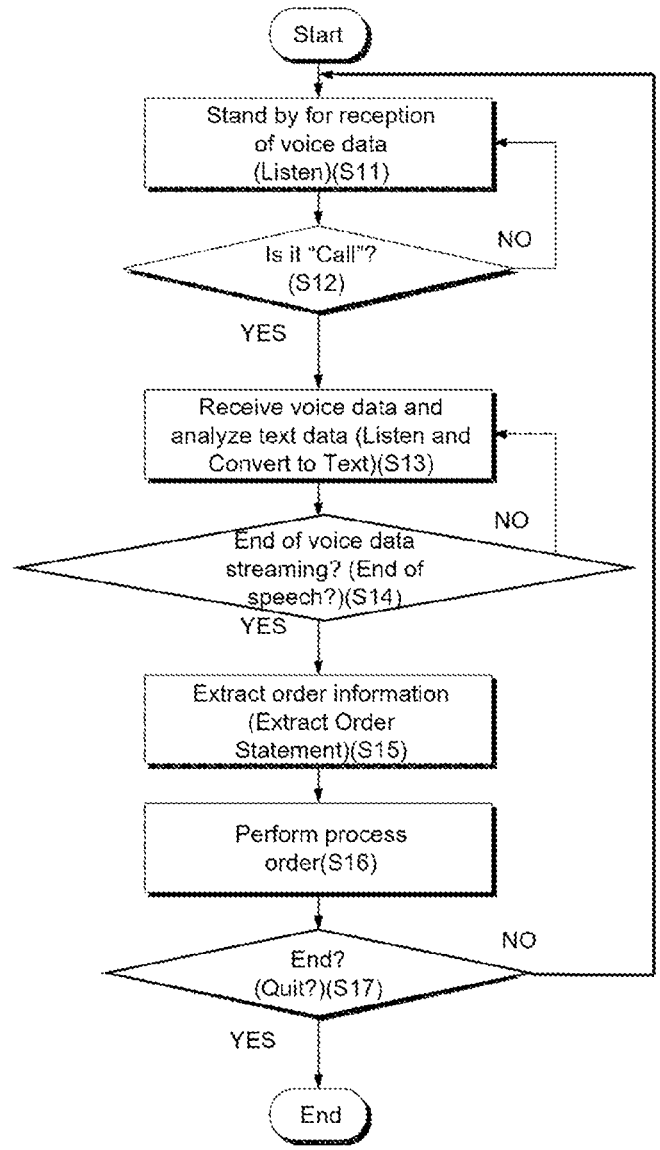

AI BASED VOICE ORDERING SYSTEM AND METHOD THEREFOR

TECHNICAL FIELD

The present invention relates to an AI-based voice ordering system and a method therefor, and more particularly, to an AI-based voice ordering system and a method therefor, in which an orderer places an order with a voice at a nearby ordering smart terminal, and order details are displayed to a provider or an open place to allow the provider to recognize and provide a service, so that an ordering scheme of ordering and providing a service in a non-face-to-face asynchronous manner may be provided.

BACKGROUND ART

In the restaurant industry such as restaurants, orders for food may frequently occur. In such places, communication between an orderer and a provider may frequently occur for placing an order, so that it may be often noisy and difficult to communicate with each other.

Accordingly, in the relevant technical field, there is a demand for development of a technology in which a voice is automatically transmitted to a provider as order information provided by the provider when an order is easily placed through the voice while an orderer and the provider do not face each other, so that convenience of the orderer and the provider may be enhanced.

As the related art, Korean Unexamined Patent Publication No. 10-2016-0087895, "Voice ordering PoS system (Sound PoS system)", relates to a voice ordering terminal provided therein with a mapping table for converting a name of a food sold at a restaurant into a code corresponding to the name, configured to receive a number of a table where a customer is located and order contents with a voice from a serving employee who is in charge of serving, configured to convert the order contents into a text, and configured to output a food code corresponding to the text by using the mapping table.

In addition, Korean Unexamined Patent Publication No. 10-2014-0112893, "Remote management system for voice order processing device (Remote management system for wireless ordering device)", relates to a remote management system for a voice order processing device configured to collect individual unique texts for each industry type using the voice order processing device, input the collected individual text to a user terminal of the voice order processing device, and receive and process relevant management data when a failure or an error occurs during an operation.

Further, Korean Unexamined Patent Publication No. 10-2004-0025589, "Voice ordering apparatus and voice order reception method using the same (Voice-order apparatus and voice-order accept method)", relates to a technology related to a voice ordering apparatus and a voice order reception method using the same, in which order information including table information of an orderer and voice information input by the orderer with a voice are sequentially stored, the table information of the order information that is stored first is output to a display unit according to a command of an order recipient, and the voice information is output through a speaker unit, so that an order and reception of the order are easily performed.

In addition, Korean Unexamined Patent Publication No. 10-2001-0016997, "System and method for processing voice order (System and method for processing speech-order)", relates to a technology related to a system for processing a voice order, which includes a provider server, an orderer phone including a landline phone and a mobile phone, an ordering server, a communication network for connecting the orderer phone to the ordering server, and the Internet for connecting the provider server to the ordering server, wherein the ordering server includes: an automatic response unit (ARU) for receiving a voice order of an orderer in response to a call of the orderer phone; a voice recognition unit for converting the received voice order into a text; and an order processing unit for creating an order form according to the converted order text to transmit the order form to the provider server.

However, the above technologies have a limitation that order information may not be accurately predicted based on an AI technology.

DOCUMENTS OF RELATED ART

Patent Documents (Patent document 1) Korean Unexamined Patent Publication No. 10-2016-0087895, "Voice ordering PoS system (Sound PoS system)"

(Patent document 2) Korean Unexamined Patent Publication No. 10-2014-0112893, "Remote management system for voice order processing device (Remote management system for wireless ordering device)"

(Patent document 3) Korean Unexamined Patent Publication No. 10-2004-0025589, "Voice ordering apparatus and voice order reception method using the same (Voice-order apparatus and voice-order accept method)"

(Patent document 4) Korean Unexamined Patent Publication No. 10-2001-0016997, "System and method for processing voice order (System and method for processing speech-order)"

DETAILED DESCRIPTION OF THE INVENTION

Technical Problem

The present invention has been made to solve the above problems, and an object of the present invention is to provide an AI-based voice ordering system and a method therefor, in which an orderer places an order with a voice at a nearby ordering smart terminal, and order details are displayed to a provider or an open place to allow the provider to recognize and provide a service, so that an ordering scheme of ordering and providing a service in a non-face-to-face asynchronous manner may be provided.

In addition, an object of the present invention is to provide an AI-based voice ordering system and a method therefor, in which, on a provider side, a customer contact time for receiving an order may be unnecessary, an ordering time and a response time may be shortened while the number of movements of an employee is reduced so that a congestion degree may be reduced, a situation in which a provider continuously stands by for reception of an order of a customer may be eliminated to increase efficiency of the provider, and the order may be recorded in a text rather than a voice to prevent omissions and ensure clear recognition of order details.

Further, an object of the present invention is to provide an AI-based voice ordering system and a method therefor, in which, on a customer side, it may be unnecessary to call a provider for an order, a call stand-by time caused by absence of the provider (employee) or an in-service state to another customer may be unnecessary, an order may be placed at any time regardless of circumstances of the provider if necessary, and unnecessary repeated orders may be reduced.

In addition, an object of the present invention is to provide an AI-based voice ordering system and a method therefor, in which, in a business place on a provider side, noise generated when placing an order with a voice may be suppressed, an amount of movements within the business place may be reduced to improve an overall atmosphere of the business place, and food culture may be improved.

However, objects of the present invention are not limited to the objects described above, and other objects that are not described above will be clearly understood by those skilled in the art from the following description.

Technical Solution

To achieve the objects described above, according to one embodiment of the present invention, there is provided a voice ordering method including:
a first step of standing by, by an ordering smart terminal (100), for reception of voice data;
a second step of analyzing, by the ordering smart terminal (100), whether an input signal is received by an input unit (120) corresponding to a microphone activation button; and
a third step of returning to the first step when the input signal is not received as a result of the analysis, and conversely, allowing, by the ordering smart terminal (100), analysis of text data to be performed by receiving a voice signal from a microphone (110), converting the voice signal into voice data in a preset format, and transmitting the converted voice data to a voice ordering server (300) through a host terminal (100a) connected to a network (200) when the input signal is received.

According to one embodiment of the present invention, after the third step, the voice ordering method may further include a fourth step of analyzing, by the ordering smart terminal (100), an end of voice data streaming through whether the voice signal is not received through the microphone (110) within a preset time.

In addition, according to one embodiment of the present invention, after the fourth step, the voice ordering method may further include a fifth step of returning to the fourth step when the voice data streaming is not terminated as a result of the analysis, and conversely, allowing, by the ordering smart terminal (100), order information extraction to be performed on the voice data by the voice ordering server (300) by requesting the order information extraction to the voice ordering server (300) through the host terminal (100a) connected to the network (200) when the voice data streaming is terminated as a result of the analysis.

In addition, according to one embodiment of the present invention, after the fifth step, the voice ordering method may further include a sixth step of analyzing, by the voice ordering server (400), whether the order information extraction is terminated.

In addition, to achieve the objects described above, according to another embodiment of the present invention, there is provided an AI-based voice ordering system including:
an ordering smart terminal (100) for standing by for reception of voice data, and analyzing whether an input signal is received by an input unit (120) corresponding to a microphone activation button; and a voice ordering server (300) for performing analysis of text data by receiving a voice signal from a microphone (110) on the ordering smart terminal (100), converting the voice signal into voice data in a preset format, and receiving the converted voice data through a host terminal (100a) connected to a network (200) when the input signal is received as a result of the analysis of the ordering smart terminal (100).

Advantageous Effects

According to the AI-based voice ordering system and the method therefor of one embodiment of the present invention, an orderer may place an order with a voice at a nearby ordering smart terminal, and order details may be displayed to a provider or an open place to allow the provider to recognize and provide a service, so that an ordering scheme of ordering and providing a service in a non-face-to-face asynchronous manner can be provided.

In addition, according to the AI-based voice ordering system and the method therefor of another embodiment of the present invention, on a provider side, a customer contact time for receiving an order can be unnecessary, an ordering time and a response time can be shortened while the number of movements of an employee is reduced so that a congestion degree can be reduced, a situation in which a provider continuously stands by for reception of an order of a customer can be eliminated to increase efficiency of the provider, and the order can be recorded in a text rather than a voice to prevent omissions and ensure clear recognition of order details.

Further, according to the AI-based voice ordering system and the method therefor of still another embodiment of the present invention, on a customer side, it can be unnecessary to call a provider for an order, a call stand-by time caused by absence of the provider (employee) or an in-service state to another customer can be unnecessary, an order can be placed at any time regardless of circumstances of the provider if necessary, and unnecessary repeated orders can be reduced.

Moreover, according to the AI-based voice ordering system and the method therefor of yet another embodiment of the present invention, in a business place on a provider side, noise generated when placing an order with a voice can be suppressed, an amount of movements within the business place can be reduced to improve an overall atmosphere of the business place, and food culture can be improved.

DESCRIPTION OF THE DRAWINGS

FIG. 1 is a view showing an AI-based voice ordering system 1 according to an embodiment of the present invention.

FIG. 2 is a block diagram showing components of an ordering smart terminal 100 of the AI-based voice ordering system 1 according to the embodiment of the present invention.

FIG. 3 is a block diagram showing components of a voice ordering server 300 of the AI-based voice ordering system 1 according to the embodiment of the present invention.

FIG. 4 is a flowchart for describing voice data and a processing process of the AI-based voice ordering system 1 according to the embodiment of the present invention.

BEST MODE

Hereinafter, a preferred embodiment of the present invention will be described in detail with reference to the accompanying drawings. In the following description of the present invention, detailed descriptions of known functions and configurations incorporated herein will be omitted when they may make the subject matter of the present invention unnecessarily unclear.

In the present disclosure, when one element 'transmits' data or a signal to another element, it means that the element may directly transmit the data or the signal to the other element, and may transmit the data or the signal to the other element via at least one another element.

FIG. 1 is a view showing an AI-based voice ordering system 1 according to an embodiment of the present invention. Referring to FIG. 1, an AI-based voice ordering system 1 may include an ordering smart terminal group 100g including a plurality of ordering smart terminals 100, a host terminal 100a, a network 200, a voice ordering server 300, a display device 400, and an AI server 500. In this case, the ordering smart terminal 100 may be configured as a one-way terminal or a two-way terminal.

When the ordering smart terminal 100 is a one-way terminal, the ordering smart terminal 100 may perform a function of only transmitting voice data to the voice ordering server 300 or a gateway, and when the ordering smart terminal 100 is a two-way terminal, the ordering smart terminal 100 may perform a function of transmitting the voice data to the voice ordering server 300 or the gateway, and receiving a result to display the result.

In other words, when the ordering smart terminal 100 is a one-way terminal, an output unit 140 may be excluded from a configuration of FIG. 2, and an input unit 120 may be configured as a microphone activation button. When the ordering smart terminal 100 is a two-way terminal, the output unit 140 may be additionally configured as in the configuration of FIG. 2, the output unit 140 may be configured as a liquid crystal display device, and the ordering smart terminal 100 may be a wireless terminal having a computing function, such as a tablet PC.

Meanwhile, a communication scheme between each ordering smart terminal 100 and the network 200 may be directly implemented by a wired or wireless scheme, or may be configured such that transmission and reception of a signal and data may be performed with the voice ordering server 300 connected to the network 200 through the host terminal 100a operated by a provider who manages each ordering smart terminal 100.

The display device 400 may adopt an LBS technology, so that when a plurality of providers are present, an ID tag for distinguishing individual providers or an ID touch pen (not shown) including the ID tag may be additionally provided to a touch monitor provided on a provider side to output an advertisement in a local commercial area, and thus each of the providers may be identified by using the ID touch pen, or each of the providers may be identified by inputting the ID tag on a touch screen.

FIG. 2 is a block diagram showing components of an ordering smart terminal 100 of the AI-based voice ordering system 1 according to the embodiment of the present invention. Referring to FIG. 2, the ordering smart terminal 100 may include a microphone 110, an input unit 120, an MCU 130, an output unit 140, a communication module 150, and a memory 160.

In this case, when a voice signal is input to the microphone 110 according to an input to the input unit 120 corresponding to the microphone activation button, the MCU 130 may receive the voice signal to temporarily store the voice signal in an internal buffer memory 160.

Thereafter, the MCU 130 may provide the voice signal stored in the memory 160 to the host terminal 100a through the communication module 150, or may convert the voice signal into a preset voice file format to generate voice data and transmit the generated voice data to the host terminal 100a through the communication module 150, so that the voice data may be provided to a VOS module 321 of the voice ordering server 300 connected to the network 200 through the host terminal 100a.

FIG. 3 is a block diagram showing components of a voice ordering server 300 of the AI-based voice ordering system 1 according to the embodiment of the present invention. Referring to FIG. 3, the voice ordering server 300 may include a transmission/reception unit 310, a control unit 320, and a database 330, and the control unit 320 may include a voice order server (VOS) module 321, an audio-to-text converter (ATC) module 322, an order statement extractor (OSE) module 323, and an automatic inspection module 324.

Meanwhile, although the modules constituting the control unit 320 may be configured as separate modules on one server as shown in FIG. 3 or may be configured as mutually different servers according to the present invention, for convenience of understanding, the present invention will be described below based on a module that is an independent logical unit.

After a customer performs an input on the microphone activation button corresponding to the input unit 120 on the ordering smart terminal 100, the VOS module 310 may control the transmission/reception unit 310 to receive an order identification ID and a start signal from the host terminal 100a that has received the order identification ID and the start signal from the ordering smart terminal 100.

In this case, the VOS module 310 may control the transmission/reception unit 310 to receive a host terminal ID from the host terminal 100a together with the order identification ID and the start signal.

Thereafter, the VOS module 310 may control the transmission/reception unit 310 to receive voice data of the ordering smart terminal 100 through the network 200 from the host terminal 100a that has received the voice data in a streaming scheme when a voice order is performed by using the microphone 110, and may temporarily store the voice data using the order identification ID as metadata and the host terminal ID in the database 330.

The ATC module 322 may analyze the voice data into a text. In this case, when analyzing the voice data into the text, the ATC module 322 may perform pre-collection on voice data received through the microphone 110 before receiving the input signal by the input unit 120 for the voice data received by each ordering smart terminal, and may perform the analysis through a request for conversion of the voice data into a text sentence to the AI server 500 through the network 200 on each pre-collected voice data.

In more detail, the AI server 500 may analyze the voice data distributed and stored by a distribution file program through a machine learning algorithm, convert a character constituting each voice into a text, and combine the converted texts to generate the text sentence.

The machine learning algorithm used in the AI server 500 may be one of a decision tree (DT) classification algorithm, a random forest (RF) classification algorithm, and a support vector machine (SVM) classification algorithm.

The AI server 500 may analyze the voice data distributed and stored by the distribution file program, extract feature information including a gender, an age group, and a standard language or dialect corresponding to a plurality of classification information by using a result of the analysis, learn the extracted feature information by using at least one of a plurality of machine learning algorithms, and combine texts by using a result of the learning to generate the text sentence.

In other words, the AI server 500 may adopt an ensemble structure including a plurality of complementary machine learning algorithms to improve accuracy of the text sentence.

The DT classification algorithm corresponds to a scheme of performing learning with a tree structure to derive a result, in which interpretation and understanding of the result may be easy, a data processing speed may be fast, and a rule may be derived based on a search tree. An RF may be applied to improve low classification accuracy of a DT. The RF classification algorithm corresponds to a scheme of deriving a result of performing learning by using a plurality of DTs as an ensemble, in which the result may be more difficult to understand than the DT, while accuracy of the result may be higher than accuracy of the result of the DT. An SVM may be applied to improve overfitting that may occur through DT or RF learning. The SVM classification algorithm corresponds to a scheme of classifying data belonging to mutually different classifications based on a plane, in which the SVM classification algorithm may generally have high accuracy and may structurally have low sensitivity to the overfitting.

In other words, the ATC module 322 may analyze the voice data into a text corresponding to a sentence and return analyzed text data to the VOS module 310 so as to allow the VOS module 310 to provide the text data corresponding to a text sentence to the OSE module 323.

In this case, the VOS module 310 may add the voice data to the voice data using the order identification ID as metadata and the host terminal ID, which are temporarily stored.

The OSE module 323 may extract order information from the analyzed text data, and provide the extracted order information to the VOS module 310.

In this case, when the OSe module 323 extracts the order information from the text data, through the request to the AI server 500 described above, the AI server 500 may extract sentence information frequently used in the classification information corresponding to the gender, the age group, the standard language or dialect corresponding to the feature information from big data DB of the AI server 500, and may extract the order information by extracting an order name provided to an order list by the host terminal 100*a* corresponding to the provider side and number information frequently used when placing an order for each order name based on the extracted sentence information.

Meanwhile, the OSE module 323 may extract the order information from the text data and return the order information to the VOS module 310, so that the VOS module 310 may store the voice data, the text data, and the order information using the order identification ID and the host terminal ID as metadata in the database 330 as one piece of "order unit information".

The order unit information stored in the database 330 by the VOS module 310 may be used as legal data when a dispute between the provider and an orderer occurs.

Then, the VOS module 321 may control the transmission/reception unit 310 to transmit the order unit information to the host terminal 100*a* through the network 200, so that the order unit information may be provided to the display device 400 by the host terminal 100*a*, or the order unit information may be directly provided to the display device 400 through the network 200.

In more detail, the VOS module 321 may extract the host terminal ID and the order information from the order unit information corresponding to the order identification ID, and may control the transmission/reception unit 310 to transmit the extracted host terminal ID and the extracted order information to the display device 400 through the network 200 together with the order identification ID.

After a provider ID is recognized through RF-based recognition of the ID tag or the ID touch pen including the ID tag through an RF reader 410, the order information and the order identification ID corresponding to the host terminal ID matching the recognized provider ID may be output on the display device 400 in an order of an order time. In addition, the provider may receive and process an order for the order information output on the display device 400, and delete the received order information.

Accordingly, the provider may respond after recognizing the order recorded on the display device 400 corresponding to the touch monitor, and a function of allowing the provider ID corresponding to provider information to be automatically recognized by the display device 400 so as to output and manage the order information related to the provider when the provider approaches the display device 400 to touch the monitor with an ID tag or an ID touch pen carried by the provider may be provided.

The automatic inspection module 324 may control the transmission/reception unit 310 to receive the voice data received through the microphone 110 for a preset time at every preset period through the host terminal 100*a* connected to the network 200 in each ordering smart terminal 100 in an inactivation state of the microphone activation button corresponding to the input unit 120. Then, the automatic inspection module 325 may analyze a pattern of the voice data so that when a recognition rate continuously decreases below a predetermined value, the automatic inspection module 325 may control the transmission/reception unit 310 to provide the order identification ID to the display device 400 through the network 200 or to the host terminal 100*a* that is a provider-side terminal, or may control the transmission/reception unit 310 to provide the order identification ID to the ordering smart terminal 100 when the ordering smart terminal 100 is a two-way terminal, so that the order identification ID may be output to the output unit 140 of the ordering smart terminal 100.

In addition, in a case of a terminal having no request for a long time as compared with other terminals among the ordering smart terminals 100, similarly, the automatic inspection module 324 may control the transmission/reception unit 310 to provide the order identification ID of the ordering smart terminal 100 to the display device 400 through the host terminal 100*a* connected to the network 200 or to the host terminal 100*a* that is the provider-side terminal, or may control the transmission/reception unit 310 to provide the order identification ID of the ordering smart terminal 100 to the ordering smart terminal 100 when the ordering smart terminal 100 is a two-way terminal, so that the order identification ID may be output to the output unit 140 of the ordering smart terminal 100.

FIG. 4 is a flowchart for describing voice data and a processing process of the AI-based voice ordering system 1 according to the embodiment of the present invention. Referring to FIG. 4, the ordering smart terminal 100 may stand by for reception of voice data (Listen) (S11).

After the step S11, the ordering smart terminal 100 may analyze whether an input signal is received by an input unit 120 corresponding to a microphone activation button, or a call voice (Is it "Call") (S12).

According to an embodiment of the present invention, the ordering smart terminal 100 may recognize "Call" as a call voice for placing an order based on voice recognition while maintaining an activation state of a microphone 110. In this case, the call voice for placing the order may be related to a word or a sentence that is commonly called when placing an order or making a request, such as "Sir", "Ma'am", "Here", and "I'm ready to order", which are set on the ordering smart terminal 100, without being limited to "Call".

In other words, the ordering smart terminal 100 may continuously receive a voice signal and may receive, when the call voice is detected, an order voice from then on, and a customer may selectively perform one of two schemes of pressing a button and speaking an order, and making a call comment first and speaking an order as described above.

The process may return to the step S11 when the input signal is not received as a result of the analysis in the step S12, and conversely, the ordering smart terminal 100 may allow analysis of text data to be performed by receiving a voice signal from a microphone 110, convert the voice signal into voice data in a preset format, and transmit the converted voice data to a voice ordering server 300 through a host terminal 100a connected to a network 200 when the input signal is received (Listen and convert to text) (S13).

After the step S13, the ordering smart terminal 100 may analyze an end of voice data streaming through whether the voice signal is not received through the microphone 110 within a preset time (End of speech?) (S14).

The process may return to the step S14 when the voice data streaming is not terminated as a result of the analysis in the step S14, and conversely, the ordering smart terminal 100 may allow order information extraction to be performed on the voice data by the voice ordering server 300 by requesting the order information extraction to the voice ordering server 300 through the host terminal 100a connected to the network 200 when the voice data streaming is terminated as a result of the analysis in the step S14 (Extract order statement) (S15).

After the step S15, the voice ordering server 400 may perform a process order for processing the order information to the display device 400 through the network 200 (S16).

In more detail, the step S16 may correspond to a process of processing the order information extracted from the voice by the voice ordering server 400, and preferably, the order information may be at least provided and displayed on the display device 400 of the provider, or transmitted to the provider.

After the step S16, the voice ordering server 400 may analyze whether the process is terminated (Quit?) (S17). In other words, while an order of performing processing is voice input-extraction-processing, the voice ordering server 400 may analyze whether such a process is terminated.

In this case, according to one embodiment of the present invention, the voice ordering server 400 may request a response to the ordering smart terminal 100 connected to the host terminal 100a through the network 200 when analyzing the end, so that a warning sound or the like may be output through a voice output module constituting the output unit 140 provided in the ordering smart terminal 100, and termination of the order information may be analyzed through whether the input signal is received within a preset time by the input unit 120 on the ordering smart terminal 100.

The voice ordering server 400 may terminate the process upon the termination as a result of the analysis in the step S17, and conversely, the process may return to the step S11, an additional order may be received from the ordering smart terminal 100, and the processes of the steps S11 to S17 may be performed when the termination is not performed.

According to another embodiment of the present invention, the ordering smart terminal 100 may further include a brainwave measurement device (not shown).

Accordingly, the voice ordering server 300 may control the transmission/reception unit 310 to connect a data session through the ordering smart terminal 100 and the host terminal 100a connected to the network 200, and receive brainwave information measured by the brainwave measurement device from the ordering smart terminal 100 through data session connection according to pairing settings through short-range wireless communication between the ordering smart terminal 100 and the brainwave measurement device through a brainwave measurement request for the brainwave measurement device to the ordering smart terminal 100.

Thereafter, the voice ordering server 300 may analyze a current physical state (normal state, anxiety, etc.) of an orderer according to the brainwave information received from the ordering smart terminal 100 immediately after commodities (food, an article, or a service) of the provider are provided according to the order information so as to analyze a matching state of the order information.

In general, a brainwave refers to a biological signal that directly or indirectly reflects a consciousness or unconsciousness state of a human, which corresponds to a wavelength measured in all areas on scalp of the human and mainly having a frequency of 30 Hz or less with a potential difference of several tens of microvolts.

The brainwave may be classified into a delta wave, a theta wave, an alpha wave, a beta wave, and a gamma wave for each frequency band. The delta wave refers to a brainwave having a frequency of 4 Hz or less, which typically appears in a normal sleeping state, and the theta wave refers to a brainwave having a frequency of about 4 to 8 Hz, which mainly appears in a mentally unstable or distracted state and often appears in adolescents with learning difficulties. The alpha wave refers to a brainwave having a frequency of about 8 to 12 Hz, which generally appears clearly when a mental state is stable and a comfortable psychological state is taken with the eyes closed. In addition, the alpha wave may also occur when a high degree of concentration is achieved so as to be separated from a surrounding situation or when psychological stability is achieved due to meditation. The gamma wave refers to a brainwave having a frequency of 30 to 50 Hz, which appears in an excited state. The beta wave refers to a brainwave having a frequency of about 12 to 30 Hz, which mainly appears when there is slight tension or attention of a predetermined level or more is paid. The beta wave may widely appear over a whole brain when an exercise, learning, or a task is performed. The beta wave may be classified into an SMR wave having a frequency of 12 to 15 Hz, an intermediate beta wave having a frequency of 15 to 18 Hz, and a high beta wave having a frequency of 20 Hz or more. The beta wave is also referred to as stress wave because the beta wave appears stronger when stress such as anxiety or tension is applied. The SMR wave may appear when attention is paid, the intermediate beta wave having a frequency of 15 to 18 Hz may appear in a left brain while concentration or normal activities are performed, and the high beta wave of 20 Hz or higher may appear when tension and anxiety are continuously applied.

Accordingly, the voice ordering server 300 may analyze the received brainwave information as a state in which the orderer is in a bad mood when the theta wave, the gamma wave, and the beta wave are detected from the received brainwave information so as to temporarily determine the order information as a mismatch, and may control the transmission/reception unit 310 to generate and transmit a query for dissatisfaction with the commodities for the order information (first option) or wrong order information (second option) to the ordering smart terminal 100 through the host terminal 100a connected to the network 200.

Thereafter, the voice ordering server 300 may receive a response to the query from the ordering smart terminal 100, may set a penalty to the host terminal ID of the provider in a case of the first option, and may receive a correction request for the order information from the ordering smart terminal 100 and replace the existing "order unit information" with corrected order information through the correction request to provide the corrected order information to the display device 400 through the network 200 in a case of the second option.

In this case, the order unit information replaced by the corrected order information will be useful when the commodities are mainly articles or services rather than foods.

Meanwhile, the voice ordering server 300 may analyze the received brainwave information as a state in which the orderer is in a good mood when the alpha wave is detected from the received brainwave information so as to temporarily determine the order information as a match, and may control the transmission/reception unit 310 to generate and transmit a query for satisfaction with the commodities for the order information (third option) or an exact match with the order information (fourth option) to the ordering smart terminal 100 through the host terminal 100a connected to the network 200.

Thereafter, the voice ordering server 300 may receive a response to the query from the ordering smart terminal 100, may set a point to the host terminal ID of the provider in a case of the third option, and may provide the voice data, the text data, and the order information to the AI server 500 through the network 200 so as to construct a big data DB together with the feature information obtained from the AI server 500 in a case of the fourth option.

In addition, the present invention may be implemented as a computer-readable code on a computer-readable recording medium. The computer-readable recording medium includes all types of recording devices in which data readable by a computer system is stored.

Examples of the computer-readable recording medium include a ROM, a RAM, a CD-ROM, a magnetic tape, a floppy disk, an optical data storage device, and the like, and the present invention may also be implemented in the form of a carrier wave (e.g., transmission through the Internet).

In addition, the computer-readable recording medium may be distributed over computer systems connected to each other through a network, so that the computer-readable code may be stored and executed in a distributed manner. Further, functional programs, codes, and code segments for implementing the present invention may be easily inferred by programmers in the art to which the present invention pertains.

As described above, the preferred embodiment of the present invention has been disclosed in the present disclosure and the drawings. Although specific terms have been used herein, they are used only in a general sense to easily describe the technical content of the present invention and help understanding of the invention, and are not intended to limit the scope of the present invention. It will be apparent to a person having ordinary skill in the art to which the present invention pertains that other modifications based on the technical idea of the present invention in addition to the embodiments disclosed herein may be implemented.

DESCRIPTION OF REFERENCE NUMERALS

1: AI-based voice ordering system 100: Ordering smart terminal
100a: Host terminal 100g: Ordering smart terminal group
200: Network 300: Voice ordering server
400: Display device 500: AI server

The invention claimed is:
1. An AI-based voice ordering system comprising:
an ordering smart terminal (100) for standing by for reception of voice data, and analyzing whether an input signal is received by an input unit (120) corresponding to a microphone activation button; and
a voice ordering server (300) for performing analysis of text data by receiving a voice signal from a microphone (110) on the ordering smart terminal (100), converting the voice signal into voice data in a preset format, and receiving the converted voice data through a host terminal (100a) connected to a network (200) when the input signal is received as a result of the analysis of the ordering smart terminal (100), wherein:
the ordering smart terminal (100) includes a microphone (110), an input unit (120), an MCU (130), a communication module (150), and a memory (160),
when a voice signal is input to the microphone (110) depending on an input to the input unit (120), the MCU (130) receives the voice signal to temporarily store the voice signal in the memory (160),
the MCU (130) provides the voice signal stored in the memory (160) to the host terminal (100a) through the communication module (150), or may convert the voice signal into a preset voice file format to generate voice data and transmit the voice signal to the host terminal (100a) through the communication module (150), so that the voice data may be provided to a VOS module (321) of the voice ordering server (300) connected to the network (200) through the host terminal (100a), and
when a plurality of providers are present, an ID tag for distinguishing individual providers or an ID touch pen including the ID tag is additionally provided to a touch monitor provided on a provider side to output an advertisement in a local commercial area, and each of the providers are identified by using the ID touch pen, or each of the providers is identified by inputting the ID tag on a touch screen.

* * * * *